US009820310B2

(12) United States Patent
Xie

(10) Patent No.: US 9,820,310 B2
(45) Date of Patent: Nov. 14, 2017

(54) NETWORK CONNECTION METHOD AND SYSTEM

(75) Inventor: Zhongkun Xie, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 367 days.

(21) Appl. No.: 14/403,404

(22) PCT Filed: Jun. 29, 2012

(86) PCT No.: PCT/CN2012/077871
§ 371 (c)(1),
(2), (4) Date: Nov. 24, 2014

(87) PCT Pub. No.: WO2013/177843
PCT Pub. Date: Dec. 5, 2013

(65) Prior Publication Data
US 2015/0163833 A1 Jun. 11, 2015

(30) Foreign Application Priority Data

May 28, 2012 (CN) .......................... 2012 1 0168183

(51) Int. Cl.
*H04L 12/26* (2006.01)
*H04W 76/02* (2009.01)
(Continued)

(52) U.S. Cl.
CPC ......... *H04W 76/02* (2013.01); *H04L 61/6086* (2013.01); *H04M 1/7253* (2013.01);
(Continued)

(58) Field of Classification Search
CPC ......... H04W 8/22; H04W 8/24; H04W 24/08; H04W 76/02; H04L 61/6086; H04M 1/7253
See application file for complete search history.

(56) References Cited

U.S. PATENT DOCUMENTS 8,151,325 B1    4/2012  Bennett, III
2009/0061863 A1* 3/2009  Huggett ................ H04L 63/101
                                              455/434
(Continued)

FOREIGN PATENT DOCUMENTS

CN     101606361 A    12/2009
CN     101616143 A    12/2009
(Continued)

OTHER PUBLICATIONS

Supplementary European Search Report in European application No. 12878176.2, dated Oct. 23, 2015.
(Continued)

*Primary Examiner* — Jutai Kao
(74) *Attorney, Agent, or Firm* — Oppedahl Patent Law Firm LLC

(57) ABSTRACT

Disclosed are a network connection method and system. A terminal monitoring module obtains a terminal feature of a wireless terminal after detecting that a wireless terminal initiates a network connection to a computer system, queries in a terminal device feature storage module according to the obtained terminal feature whether a networking policy corresponding to the wireless terminal exists, and if yes, activates a terminal management module; the terminal management module obtains the networking policy corresponding to the wireless terminal and provides it to a user; and after receiving a networking operation instruction transmitted by the user according to the networking policy, the terminal management module controls the wireless terminal according to the networking operation instruction to implement the network connection, that is, an appropriate networking policy is adaptively selected, according to the terminal feature, for the wireless terminal currently performing a networking operation without using different terminal management systems to perform networking, thereby low- (Continued)

ering the development difficulty of the system, improving the reliability of the system, more facilitating the use of the user, and improving the satisfaction of user experience.

18 Claims, 4 Drawing Sheets

(51) Int. Cl.
 *H04W 8/18* (2009.01)
 *H04M 1/725* (2006.01)
 *H04W 8/22* (2009.01)
 *H04W 24/08* (2009.01)
 *H04W 8/24* (2009.01)
 *H04L 29/12* (2006.01)

(52) U.S. Cl.
 CPC ............... *H04W 8/18* (2013.01); *H04W 8/22* (2013.01); *H04W 8/24* (2013.01); *H04W 24/08* (2013.01)

(56) References Cited

U.S. PATENT DOCUMENTS

| | | | |
|---|---|---|---|
| 2010/0017528 A1 | 1/2010 | Awano | |
| 2011/0242975 A1* | 10/2011 | Zhao | H04L 29/12216 370/230 |
| 2014/0315536 A1* | 10/2014 | Chow | H04W 8/18 455/419 |

FOREIGN PATENT DOCUMENTS

| | | |
|---|---|---|
| CN | 101848195 A | 9/2010 |
| CN | 102256293 A | 11/2011 |

OTHER PUBLICATIONS

Nokia X1-01 User Guide, mailed on Jan. 2011.
International Search Report in international application No. PCT/CN2012/077871, dated Mar. 7, 2013. (2 pages—see entire document).
English Translation of the Written Opinion of the International Search Authority in international application No. PCT/CN2012/077871, dated Mar. 7, 2013. (6 pages—see entire document).

\* cited by examiner

NETWORK CONNECTION METHOD AND SYSTEM

TECHNICAL FIELD

The disclosure relates to the field of communications, and in particular to a method and system for network connection.

BACKGROUND

In recent years, with the continuous development of 3G mobile communication technology, the data service from a wireless terminal has become a mainstream of the communication industry to serve a user. As the number of terminals continuously increases, the problem with the deployment of the terminal service of an operating company is the exhaustion of Internet Protocol Version 4 (IPv4) addresses. An effective way to solve the problem is to upgrade the network to an IPv6 network. However, deploying an IPv6 network is a gradual process. The IPv4 and IPv6 networks face a long-term coexistence situation. In order to adapt to the situation, a wireless data terminal should support access to both the IPv4 and IPv6 networks. Therefore, the wireless data terminal has to support an IPv4 single stack, an IPv6 single stack, and an IPv4 and IPv6 dual stack, and may connect one network or connect two networks simultaneously.

There are two ways to connect a wireless data terminal to a network through a computer. One way is to virtualize the terminal as a serial port to connect it to a network through a Point to Point Protocol (PPP); the other way is to virtualize the terminal complying with a Network Driver Interface Specification (NDIS) as an Ethernet port to connect it to a network. Existing wireless data terminal may adopt the two networking ways described above at the same time.

The wireless data terminal supports IPv4 and IPv6 dual stack networking, which may be divided into single Packet Data Protocol (PDP) dual stack networking and dual PDP dual stack networking. In order to support the dual stack networking, the number of the ports of the wireless data terminal may be expanded. Different types of terminals have different expansion ways. For a terminal only supporting serial port dialing, one port complying with the NDIS standard specification may be added to support dual stack networking. For an original port complying with the NDIS standard specification, a port of the same type may be expanded again to support dual stack networking. There are also other ways in which a wireless data terminal supports dual stack networking. In the prior art, regardless of which method is adopted, for a data terminal supporting IPv4 and IPv6 single stack or dual stack network connection, the method for connecting IPv4 is different from the method for connecting IPv6, so different terminal management systems need to be used to perform networking, which increases the development difficulty of the system, reduces the reliability of the system, brings much inconvenience to users, and reduces the satisfaction of user experience.

SUMMARY

A main technical problem to be solved by the disclosure is to provide a method and system for network connection, by which the development difficulty of a system is lowered, the reliability of the system and the satisfaction of user experience are improved.

To this end, the technical solutions of the disclosure are implemented as follows.

A network connection system includes:
a wireless terminal, configured to initiate a network connection request to a computer system;
a terminal device feature storage module, configured to store a terminal feature and a networking policy corresponding to the terminal feature;
a terminal monitoring module, configured to obtain the terminal feature of the wireless terminal after detecting that the wireless terminal initiates the network connection request, query in the terminal device feature storage module accordingly whether the networking policy corresponding to the wireless terminal exists, and if the networking policy exists, add a network service corresponding to the wireless terminal to the computer system according to the terminal feature of the wireless terminal, and transmit a start instruction to a terminal management module; and
the terminal management module, configured to, after receiving the start instruction, obtain the networking policy corresponding to the wireless terminal through the terminal monitoring module, provide the obtained networking policy to a user, and further configured to after receiving a networking operation instruction, control the wireless terminal according to the networking operation instruction to implement the network connection.

The system further may include a driving module, configured to virtualize the wireless terminal as a port device; and
the terminal feature may include the type of and the number of ports, and the terminal monitoring module may be configured to obtain the type of and the number of the ports of the wireless terminal through the driving module.

The system further may include a communication instruction library, configured to store a communication instruction, and
the terminal feature may include information of capability of supporting Internet Protocol Version 4 (IPV4) and IPV6 single stack and/or dual stack of the wireless terminal, and the terminal monitoring module may be configured to obtain the information of capability of supporting Internet Protocol Version 4 (IPV4) and IPV6 single stack and/or dual stack of the wireless terminal through a corresponding communication instruction stored in the communication instruction library.

The ports of the wireless terminal may include a virtual serial port and an Ethernet port.

The communication instruction may include a USB protocol communication instruction, a chip interface instruction, an Attention (AT) instruction specified by a 3rd Generation Partnership Project (3GPP) protocol.

When controlling the wireless terminal to implement the network connection, the terminal management module may be configured to according to the networking operation instruction, transmit a networking control instruction to the terminal monitoring module according to a corresponding protocol specification, and control the wireless terminal to perform networking through the terminal monitoring module.

The terminal management module may be configured to provide the networking policy to the user by providing a specific interactive interface to the user.

A method for network connection includes that:
a terminal monitoring module detects whether a wireless terminal initiates a network connection request to a computer system, and if the wireless terminal does it, obtains a terminal feature of the wireless terminal;

the terminal monitoring module queries, according to the obtained terminal feature, in a terminal device feature storage module storing the terminal feature and a networking policy corresponding to the terminal feature whether the networking policy corresponding to the wireless terminal exists, and if the networking policy exists, then the terminal monitoring module adds a network service corresponding to the wireless terminal to the computer system according to the terminal feature of the wireless terminal, and transmits a start instruction to a terminal management module;

a terminal management module obtains the networking policy corresponding to the wireless terminal through the terminal monitoring module, and provides the obtained networking policy to a user; and the terminal management module, after receiving a networking operation instruction, controls the wireless terminal according to the networking operation instruction to implement the network connection.

The terminal feature may include the type of and the number of ports, and obtaining, by the terminal monitoring module, the type of and the number of the ports of the wireless terminal may include that:

a driving module virtualizes the wireless terminal as a port device; and the terminal monitoring module obtains the type of and the number of the ports of the wireless terminal through the driving module.

The terminal feature may include information of capability of supporting Internet Protocol Version 4 (IPV4) and IPV6 single stack and/or dual stack of the wireless terminal, and the terminal monitoring module may be configured to obtain the information of capability of supporting Internet Protocol Version 4 (IPV4) and IPV6 single stack and/or dual stack of the wireless terminal through a corresponding communication instruction stored in a communication instruction library.

The ports of the wireless terminal may include a virtual serial port and an Ethernet port.

The communication instruction may include a USB protocol communication instruction, a chip interface instruction, an Attention (AT) instruction specified by a 3rd Generation Partnership Project (3GPP) protocol.

The process during which the terminal management module controls the wireless terminal to implement the network connection may include that:

the terminal monitoring module, according to the networking operation instruction, transmits a networking control instruction to the terminal monitoring module according to a corresponding protocol specification; and the terminal monitoring module controls the wireless terminal to perform networking according to the networking control instruction.

The terminal management module provides the networking policy to the user by providing a specific interactive interface to the user.

The beneficial effects of the disclosure are that:

a terminal monitoring module in the disclosure obtains a terminal feature of a wireless terminal after detecting that a wireless terminal initiates a network connection to a computer system, queries in a terminal device feature storage module storing the terminal feature and a networking policy corresponding to the terminal feature according to the obtained terminal feature whether the networking policy corresponding to the wireless terminal exists, and if the networking policy exists, adds a network service corresponding to the wireless terminal to the computer system according to the terminal feature of the wireless terminal, and transmits a start instruction to the terminal management module; the terminal management module obtains the networking policy corresponding to the wireless terminal and provides the obtained networking policy to a user.

After receiving a networking operation instruction transmitted by the user according to the networking policy, the terminal management module controls the wireless terminal according to the networking operation instruction to implement the network connection, that is, an appropriate networking policy is adaptively selected, according to the pre-stored terminal feature and networking policy corresponding to each terminal feature and further according to the terminal feature, for the wireless terminal currently performing a networking operation without using different terminal management systems to perform networking, thereby lowering the development difficulty of the system, improving the reliability of the system, more facilitating the use of the user, and improving the satisfaction of user experience.

DETAILED DESCRIPTION

The disclosure will be further described in detail below in a way of Detailed Description in conjunction with accompanying drawings.

Figure 1:
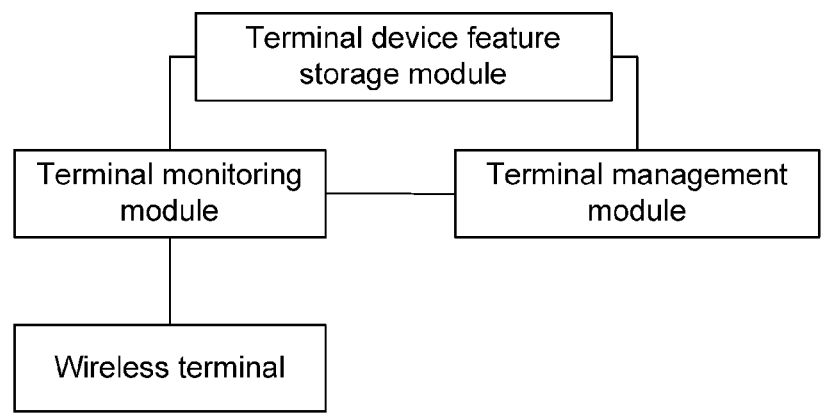
FIG. 1 is schematic diagram I of a network connection system according to one embodiment of the disclosure.

With reference to FIG. 1, a network connection system in an embodiment includes:

a wireless terminal, configured to initiate a network connection request to a computer system; in the embodiment, the wireless terminal has functions of connecting with IPv4 and IPv6 single stack or dual stack, the wireless terminal may be a USB Modem, a wireless data card, a mobile terminal and the like, and may also be other terminals having a corresponding Wireless Fidelity function such as a notebook, an IPAD;

a terminal device feature storage module, configured to store a terminal feature and a networking policy corresponding to the terminal feature, the terminal feature stored by the terminal device feature storage module may be divided specifically according to the type of the terminal, and/or the type and number of ports, and/or communication capability supported by the terminal, one networking policy is stored corresponding to each terminal feature;

a terminal monitoring module, configured to obtain the terminal feature of the wireless terminal after detecting that the wireless terminal initiates the network connection request (at this time, the wireless terminal has established a connection with the computer system), query in the terminal device feature storage module according to the terminal feature of the wireless terminal whether a networking policy corresponding to the wireless terminal exists, and if exist, then add a network service corresponding to the wireless terminal to the computer system according to the terminal feature of the wireless terminal, and transmit a start instruction to a terminal management module; and a terminal management module, configured to, after receiving the start instruction transmitted by the terminal monitoring module, obtain the networking policy corresponding to the wireless terminal through the terminal monitoring module, provide the obtained networking policy to a user, the process during which the terminal management module obtains the networking policy through the terminal monitoring module is specifically that: the terminal feature of the wireless terminal is first obtained from the terminal monitoring module, then the corresponding networking policy is found from the terminal device feature storage module according to the obtained terminal feature; or the terminal monitoring module obtains the networking policy from the terminal device feature storage module directly, then the terminal management module obtains the networking policy from the terminal monitoring module directly.

The terminal management module, after receiving a networking instruction from a user who transmitted the instruction according to the networking policy provided by the terminal management module, controls the wireless terminal according to the networking operation instruction to implement the network connection.

It is obvious that, in the embodiment, according to the pre-stored terminal feature and a networking policy corresponding to each terminal feature, after detecting that the wireless terminal initiates a connection request, an appropriate networking policy may be selected for the wireless terminal according to the terminal feature of the wireless terminal without using different terminal management systems to perform networking, thereby lowering the development difficulty of the system, improving the reliability of the system, more facilitating the users, and improving the satisfaction of user experience.

Figure 2:
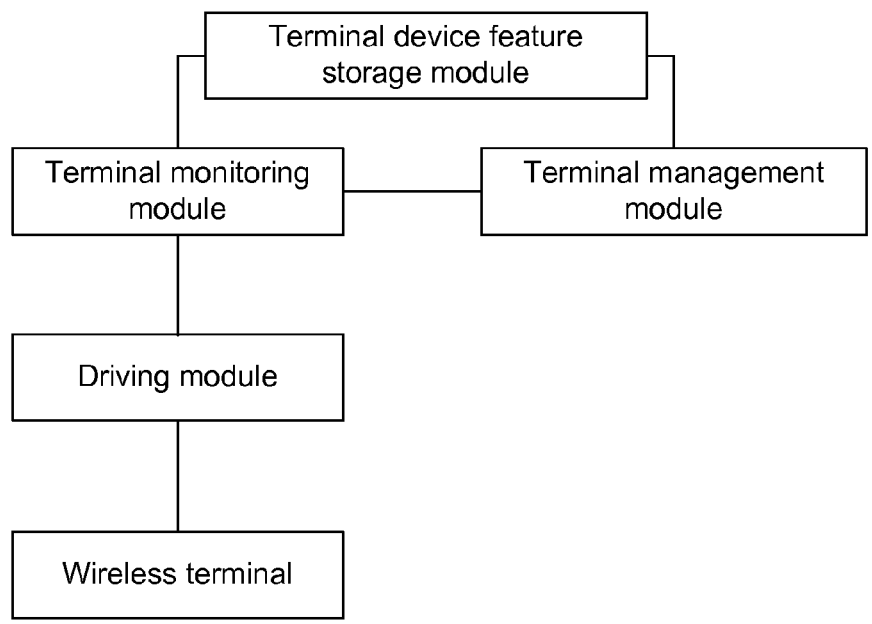
FIG. 2 is schematic diagram II of a network connection system according to one embodiment of the disclosure.

With reference to FIG. 2, the system in the embodiment further includes a driving module, configured to drive the wireless terminal and virtulize the wireless terminal as a port device. The terminal feature includes the type of ports and the number of ports, and the terminal monitoring module may obtain the type and number of the ports of the wireless terminal which initiates a communication connection through the driving module. Specifically, the driving module may virtualize the port of the wireless terminal as a serial port to perform communication or perform dial-up networking through a PPP protocol. For the wireless terminal complying with the NDIS standard specification, the wireless terminal may be virtualized as an Ethernet port and then connected to a network according to a protocol specification. The type and number of the ports of the wireless terminal may include the type and number of the virtual serial ports and the type and number of Ethernet ports.

Figure 3:
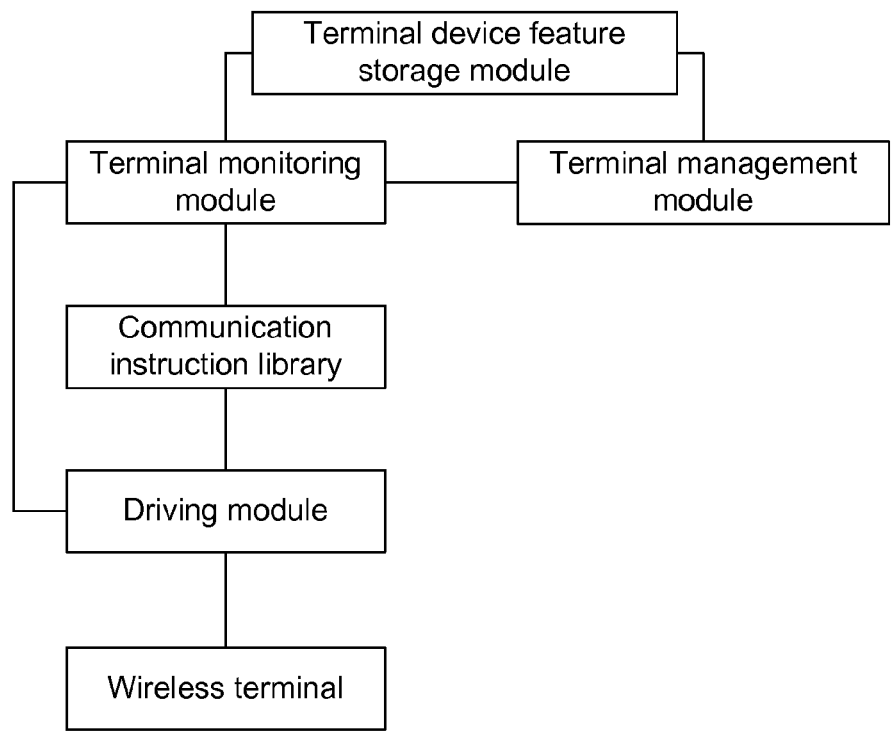
FIG. 3 is schematic diagram III of a network connection system according to one embodiment of the disclosure.

With reference to FIG. 3, the system in the embodiment may further include a communication instruction library, configured to store a communication instruction. The terminal feature may further include capability information about the terminal supporting an IPV4 and IPV6 single stack and/or dual stack, i.e., the information of communication capability of the terminal. The terminal monitoring module is configured to obtain, through a corresponding communication instruction stored in the communication instruction library, information of the capability of supporting the IPV4 and IPV6 single stack and/or dual stack of the wireless terminal which is currently initiating a network connection request, i.e., obtaining the information of the communication capability of the wireless terminal currently initiating the network connection request. In the embodiment, the communication instruction stored in the communication instruction library may include a USB protocol communication instruction, a chip interface instruction, an Attention (AT) instruction specified by a 3rd Generation Partnership Project (3GPP) protocol. The terminal monitoring module may select a corresponding communication instruction according to the actual conditions, and obtain from the wireless terminal, which is currently initiating a network communication connection request, the information of capability of supporting an IPV4 and IPV6 single stack and/or dual stack of the terminal.

It may be seen from above that the terminal feature in the embodiment may include the type and number of the ports, and the information of capability of supporting an IPV4 and IPV6 single stack and/or dual stack of the terminal. When networking policies are configured for different terminal features, an appropriate networking policy is selected for the wireless terminal specifically according to the type and number of the ports, and the information of the capability of supporting the IPV4 and IPV6 single stack and/or dual stack of the terminal specifically included in the terminal feature to perform configuration. The terminal monitoring module, after obtaining the terminal feature in which a network connection request is initiated, finds the terminal feature matched with the terminal feature from the terminal device feature storage module, then finds the networking policy matched with the wireless terminal, without using different terminal management systems to implement networking, thereby lowering the development difficulty of the system, and improving the reliability of the system. It should be noted that, in order to distinguish each wireless terminal, the terminal feature in the embodiment may further include a terminal identifier which may be a unique identifier of the terminal, and may also be a port identifier of the terminal. A specific terminal identifier may be selected specifically according to the actual situations.

In the embodiments, the terminal management module may present the selected networking policy to the user through a specific User Interface (UI) when providing the selected networking policy to the user, for the user to perform specific networking operation according to the networking policy, for example, setting networking parameters, or performing a networking operation. The user accordingly transmits a corresponding networking operation instruction to the terminal management module when performing the above operations. The process during which the terminal management module, after receiving the networking operation instruction transmitted by the user according to the networking policy, controls the wireless terminal to implement the network connection may specifically include that:

the terminal monitoring module, according to the networking operation instruction transmitted by the user, transmits a networking control instruction to the terminal monitoring module according to a corresponding protocol specification; and the terminal monitoring module controls the wireless terminal to perform networking, for example, the terminal monitoring module controls the wireless terminal to perform IPv4 and IPv6 single stack or dual stack networking.

It should be noted that, in the embodiment, the terminal device feature storage module, the terminal management module, the terminal monitoring module, the communication instruction library and the driving module may be a part of the computer system, specifically a part of a computer operating system. The operating system may be a Windows system, a Mac system or a Linux system, or may also be other smart operating systems. However, in the embodiment, other parts in which the above modules are provided outside the operating system are not excluded.

In order to understand the disclosure better, the disclosure will be further described below by taking a specific method as an example. In the embodiment, a network connection method includes that:

Step 401: a terminal monitoring module detects whether a wireless terminal initiates a network connection request to a computer system, and if a network connection request is initiated, Step 402 is the executed, otherwise detection is continued;

Step 402: the terminal monitoring module obtains a terminal feature of the wireless terminal;

Step 403: the terminal monitoring module queries, according to the obtained terminal feature, in a terminal device feature storage module, which stores the terminal feature and a networking policy corresponding to the terminal feature, whether the networking policy corresponding to the wireless terminal exists, and if existing, Step 404 is then executed, otherwise, Step 407 is then executed;

Step 404: the terminal monitoring module adds a network service corresponding to the wireless terminal to the computer system according to the terminal feature of the wireless terminal, and transmits a start instruction to a terminal management module;

Step 405: the terminal management module obtains the networking policy corresponding to the wireless terminal through the terminal monitoring module, and provides the obtained networking policy to a user;

Step 406: the terminal management module, after receiving a networking operation instruction transmitted by the user according to the networking policy, controls the wireless terminal according to the networking operation instruction to implement the network connection; and Step 407: the network connection ends.

The disclosure will be further described below by taking the terminal device feature storage module, the terminal management module, the terminal monitoring module, the communication instruction library and the driving module running an Mac system as an example. The Mac system refers to a computer in which an Mac operating system is installed. The computer may be a desktop, a notebook, an IPAD or a computer of other form.

Figure 4:
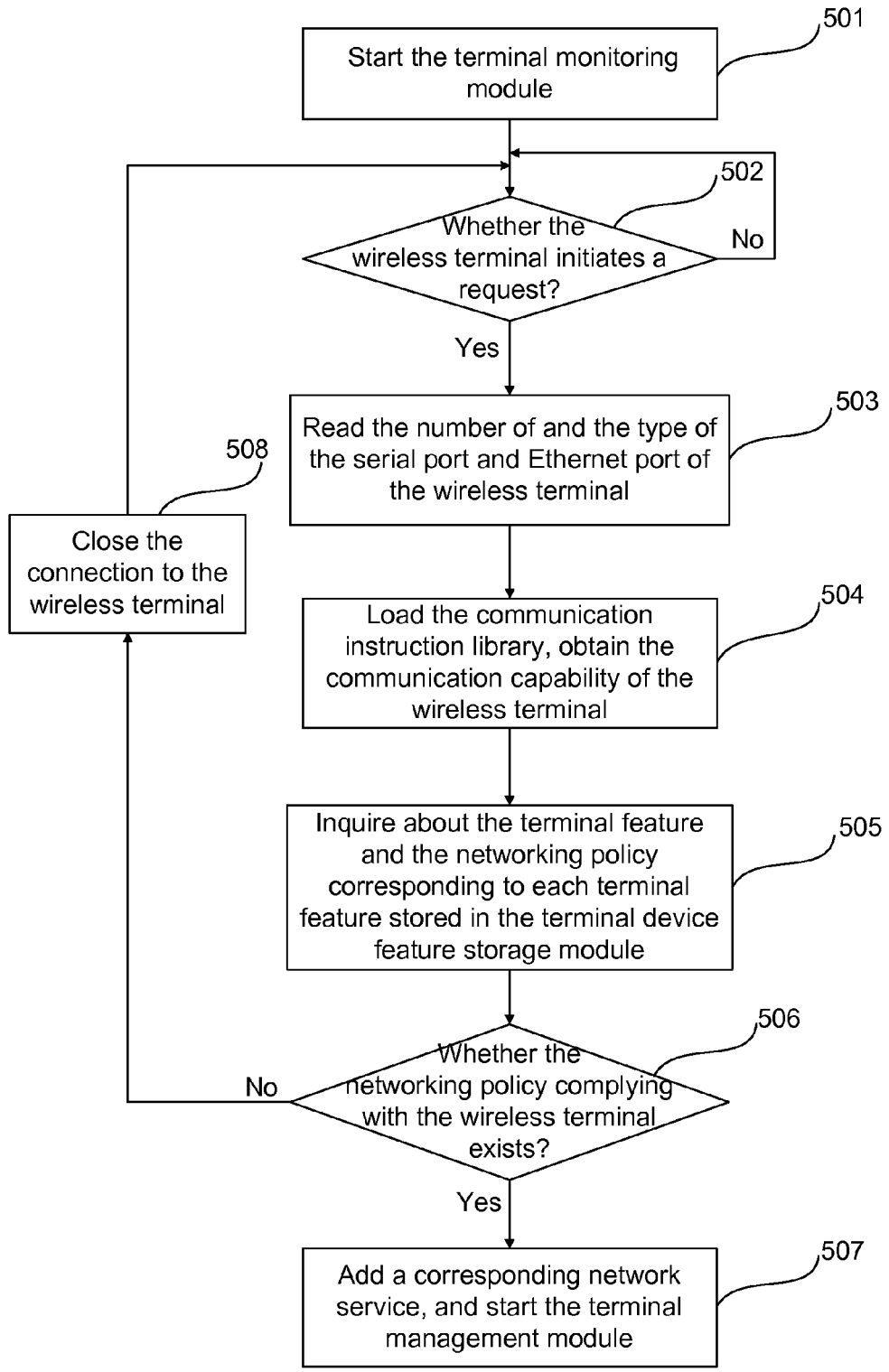
FIG. 4 is a flowchart of the workflow of a terminal monitoring module in a network connection method according to one embodiment of the disclosure.

As shown in FIG. 4, in the embodiment, the workflow of a terminal monitoring module specifically includes that:

Step 501: the terminal monitoring module is configured to be simultaneously started when the Mac system is started. The terminal monitoring module may be one or more programs of the system, which, when running, may have the highest administration authority of the system, which is convenient for setting network parameters of the operating system. In the Mac system, the program of the terminal monitoring module is started as a daemon process having a root privilege. An I/O Kit library provided by the Mac system is invoked in the process;

Step 502: the terminal monitoring module detects whether the wireless terminal initiates a connection request to the Mac system, specifically by registering a system message matched with the corresponding wireless terminal device, and if a connection request is initiated, Step 503 is then executed, otherwise, the detection is continued. In the embodiment, the terminal monitoring module further receives a message that the wireless data terminal is disconnected from the Mac system, to perform corresponding connection and disconnection;

Step 503: when the wireless terminal is connected to the Mac system, and the driving module is successfully run and loaded, the terminal monitoring module reads the number and type of the virtual serial ports and the number and type of Ethernet ports of the wireless terminal by the I/O Kit library provided by the Mac system;

Step 504: the terminal monitoring module loads the communication instruction library, transmits an instruction of querying the device capability to the wireless terminal through a corresponding communication instruction, and inquires about the information of communication capability of the wireless terminal. It may be seen from above that the communication capability information includes the information of capability of supporting IPv4 single stack, IPv6 single stack, IPv4 and IPv6 dual stack; and for the IPv4 and IPv6 dual stack, the communication capability information also includes whether to support single PDP dual stack and dual PDP dual stack;

Step 505: the terminal feature and the networking policy corresponding to the terminal feature stored in the terminal device feature storage module are inquired about according to the terminal features inquired about in Step S503 and Step 504;

Step 506: the terminal monitoring module detects whether the networking policy complying with the wireless terminal exists in the terminal device feature storage module, if existing, Step 507 is executed, otherwise Step 508 is executed;

Step 507: the terminal monitoring module, according to the type of the ports included in the wireless terminal feature, adds a corresponding network service to the computer system, and starts the terminal management module; and Step 508: the connection to the wireless terminal is closed, then Step 502 is executed.

Figure 5:
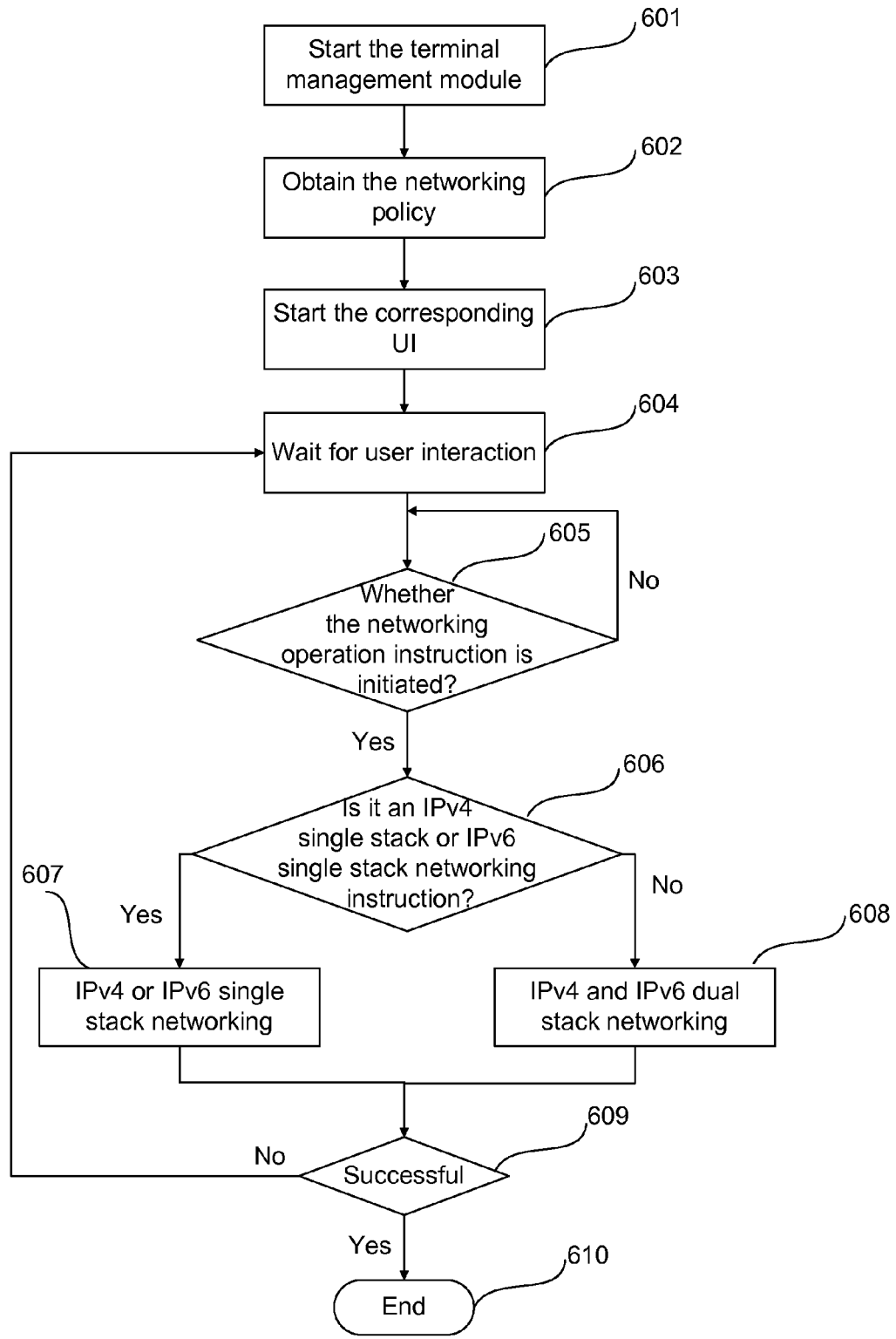
FIG. 5 is a flowchart of workflow of a terminal management module in a network connection method according to one embodiment of the disclosure.

As shown in FIG. 5, in the embodiment, the specific flow in which the terminal management module controls the wireless terminal to perform networking after receiving the start instruction transmitted by the terminal monitoring module is as follows:

Step 601: the terminal management module is started to establish communication with the terminal monitoring module. The communication mechanism is based on the inter-process communication of the system. In the Mac system, the terminal management module and the terminal monitoring module may communicate with each other by Distributed Notification provided by the system;

Step 602: the terminal management module obtains the terminal feature of the wireless terminal through the terminal monitoring module, inquires about the networking policy corresponding to each terminal feature stored in the terminal device feature storage module to obtain the corresponding networking policy;

Step 603: the terminal management module starts the specific UI according to the obtained networking policy, and presents the obtained networking policy to the user;

Step 604: the user is waited for performing corresponding interaction through the UI, the interaction includes setting networking parameters and performing network connection or disconnection, so as to issue a corresponding networking operation instruction;

Step 605: the terminal management module detects whether the user initiates the networking operation instruction, if no such instruction is initiated, detection is continued, if such an instruction is initiated, Step 606 is then executed;

Step 606: the networking operation instruction issued by the user is judged to be an IPv4 single stack or IPv6 single stack networking instruction, or an IPv4 single stack and IPv6 dual stack networking instruction, if it is the IPv4 single stack or IPv6 single stack networking instruction, Step 607 is then executed, otherwise Step 608 is then executed;

Step 607: when the user selects the IPv4 single stack or IPv6 single stack networking, the terminal management module, according to the protocol specification, initiates the IPv4 single stack or IPv6 single stack networking to the wireless terminal through the network monitoring module. For the IPv6 single stack networking, parameters such as DNS for IPv6 networking need to be statically set, which may be completed by the network monitoring module;

Step 608: when the user selects IPv4 and IPv6 dual stack networking, the networking is judged whether to be single PDP or dual PDP networking. The terminal management module, according to the protocol specification, initiates IPv4 and IPv6 dual stack networking to the wireless terminal through the network monitoring module. For the dual stack networking, when some network connection is unsuccessful, a rollback operation is performed according to error codes of the protocol;

Step 609: the current networking is judged whether to be successful, if failed, Step 604 is then executed, the user is given a hint and is waited for user interaction, otherwise, Step 610 is then executed;

Step 610: the networking is successful, the flow ends.

In the disclosure, a terminal feature of a wireless terminal may be obtained through the terminal feature pre-stored in a system and a networking policy corresponding to each terminal feature; after detecting that the wireless terminal initiated a connection request and has been connected to the system, the terminal feature of the wireless terminal can be obtained and an appropriate networking policy is selected for the wireless terminal according to the correspondence between the stored terminal feature and the networking policy without using different terminal management systems to perform networking, thereby lowering the development difficulty of the system, improving the reliability of the system, facilitating the user, and improving the satisfaction of user experience.

The above are only the preferred embodiments of the disclosure, and are not intended to limit the scope of protection of the claims of the disclosure.

What is claimed is:
1. A system for network connection, comprising:
a computer; and
a wireless terminal;
wherein the wireless terminal is configured to initiate a network connection request to the computer;
the computer comprises a non-transitory memory and a processor, wherein the non-transitory memory having stored therein instructions that, when executed by the processor of the computer, cause the processor to:
store a terminal feature and a networking policy corresponding to the terminal feature;
obtain the terminal feature of the wireless terminal after detecting that the wireless terminal initiates the network connection request, determine whether the networking policy corresponding to the wireless terminal exists, and if the networking policy exists, add a network service corresponding to the wireless terminal to the computer according to the terminal feature of the wireless terminal;
obtain the networking policy corresponding to the wireless terminal through, provide the obtained networking policy to a user, control the wireless terminal according to the networking operation instruction to implement network connection, after receiving a networking operation instruction;
virtualize the wireless terminal as a port device; and
wherein the terminal feature comprises the type of ports and the number of ports; and the processor is also configured to obtain the type of and the number of the ports of the wireless terminal.

2. The system according to claim 1, further comprising a communication instruction library, configured to store a communication instruction;
wherein the terminal feature comprises information of capability of supporting Internet Protocol Version 4 (IPV4) and IPV6 single stack and/or dual stack of the wireless terminal; and the processor is further configured to obtain the information of capability of supporting Internet Protocol Version 4 (IPV4) and IPV6 single stack and/or dual stack of the wireless terminal through a corresponding communication instruction stored in the communication instruction library.

3. The system according to claim 2, wherein the communication instruction comprises a USB protocol communication instruction, a chip interface instruction, an Attention (AT) instruction specified by a 3rd Generation Partnership Project (3GPP) protocol.

4. The system according to claim 2, wherein when controlling the wireless terminal to implement the network connection, the processor is further configured to:
according to the networking operation instruction, determine a networking control instruction according to a corresponding protocol specification, and control the wireless terminal to perform networking.

5. The system according to claim 2, wherein the processor is further configured to provide the networking policy to the user by providing a specific interactive interface to the user.

6. The system according to claim 1, wherein the ports of the wireless terminal comprise a virtual serial port and an Ethernet port.

7. The system according to claim 1, wherein when controlling the wireless terminal to implement the network connection, the processor is further configured to:
according to the networking operation instruction, determine a networking control instruction according to a corresponding protocol specification, and control the wireless terminal to perform networking.

8. The system according to claim 1, wherein the processor is further configured to provide the networking policy to the user by providing a specific interactive interface to the user.

9. The system according to claim 1, wherein when controlling the wireless terminal to implement the network connection, the processor is further configured to:
according to the networking operation instruction, determine a networking control instruction according to a corresponding protocol specification, and control the wireless terminal to perform networking.

10. The system according to claim 1, wherein the processor is further configured to provide the networking policy to the user by providing a specific interactive interface to the user.

11. A method for network connection, comprising:
detecting, by a terminal monitoring module, whether a wireless terminal initiates a network connection request to a computer, and if the wireless terminal initiates the network connection request, then obtaining a terminal feature of the wireless terminal;

querying, by the terminal monitoring module, in a terminal device feature storage module storing the terminal feature and a networking policy corresponding to the terminal feature according to the obtained terminal feature whether the networking policy corresponding to the wireless terminal exists, and if the networking policy exists, then adding a network service corresponding to the wireless terminal to the computer according to the terminal feature of the wireless terminal, and transmitting a start instruction to a terminal management module;

obtaining, by the terminal management module, the networking policy corresponding to the wireless terminal through the terminal monitoring module, and providing the obtained networking policy to a user; and after the terminal management module receives a networking operation instruction, controlling, by the terminal management module, the wireless terminal according to the networking operation instruction to implement network connection;

wherein the terminal feature comprises the type of ports and the number of ports; and obtaining, by the terminal monitoring module, the type of and the number of the ports of the wireless terminal comprises:

virtualizing, by a driving module, the wireless terminal as a port device; and obtaining, by the terminal monitoring module, the type of and the number of the ports of the wireless terminal through the driving module.

12. The method according to claim 11, wherein the terminal feature comprises information of capability of supporting Internet Protocol Version 4 (IPV4) and IPV6 single stack and/or dual stack of the wireless terminal, and the terminal monitoring module is configured to obtain the information of capability of supporting Internet Protocol Version 4 (IPV4) and IPV6 single stack and/or dual stack of the wireless terminal through a corresponding communication instruction stored in a communication instruction library.

13. The method according to claim 12, wherein the communication instruction comprises a USB protocol communication instruction, a chip interface instruction, an Attention (AT) instruction specified by a 3rd Generation Partnership Project (3GPP) protocol.

14. The method according to claim 11, wherein the ports of the wireless terminal comprise a virtual serial port and an Ethernet port.

15. The method according to claim 11, wherein controlling, by the terminal management module, the wireless terminal to implement the network connection comprises:

according to the networking operation instruction, transmitting, by the terminal monitoring module, a networking control instruction to the terminal monitoring module according to a corresponding protocol specification; and controlling, by the terminal monitoring module, the wireless terminal to perform networking according to the networking control instruction.

16. The method according to claim 11, wherein the terminal management module provides the networking policy to the user by providing a specific interactive interface to the user.

17. The method according to claim 11, wherein controlling, by the terminal management module, the wireless terminal to implement the network connection comprises:

according to the networking operation instruction, transmitting, by the terminal monitoring module, a networking control instruction to the terminal monitoring module according to a corresponding protocol specification; and controlling, by the terminal monitoring module, the wireless terminal to perform networking according to the networking control instruction.

18. The method according to claim 11, wherein the terminal management module provides the networking policy to the user by providing a specific interactive interface to the user.

* * * * *